March 20, 1928.

O. H. GOETZ 1,663,269

AUTOMOBILE BUMPER BRACKET

Filed July 30, 1924

Oscar H Goetz
INVENTOR

BY Frederick S Duncan
ATTORNEY

Patented Mar. 20, 1928.

1,663,269

UNITED STATES PATENT OFFICE.

OSCAR H. GOETZ, OF BRIDGEPORT, CONNECTICUT, ASSIGNOR TO AMERICAN CHAIN COMPANY, INC., A CORPORATION OF NEW YORK.

AUTOMOBILE BUMPER BRACKET.

Application filed July 30, 1924. Serial No. 729,033.

This invention relates to automobile bumper brackets and particularly to devices for supporting bumper bars on the horns or other frame members of an automobile, my invention being of special utility when embodied in a pivot clamp, although I contemplate the utilization of my improvements in any field for which they may be adapted by their nature.

The primary purpose of the invention is to provide a wedging device of simple and inexpensive form, to enter between the bumper bar and the end of a supporting arm, extending from the frame, with clamping and actuating devices which are easy to operate, extremely powerful in their action and can be assembled readily, serving when assembled to exert a powerful grip upon the bumper, so that the latter is supported firmly, and free from any tendency to rattle or to be displaced from its proper position for use.

Referring to the drawings.

Figure 1:
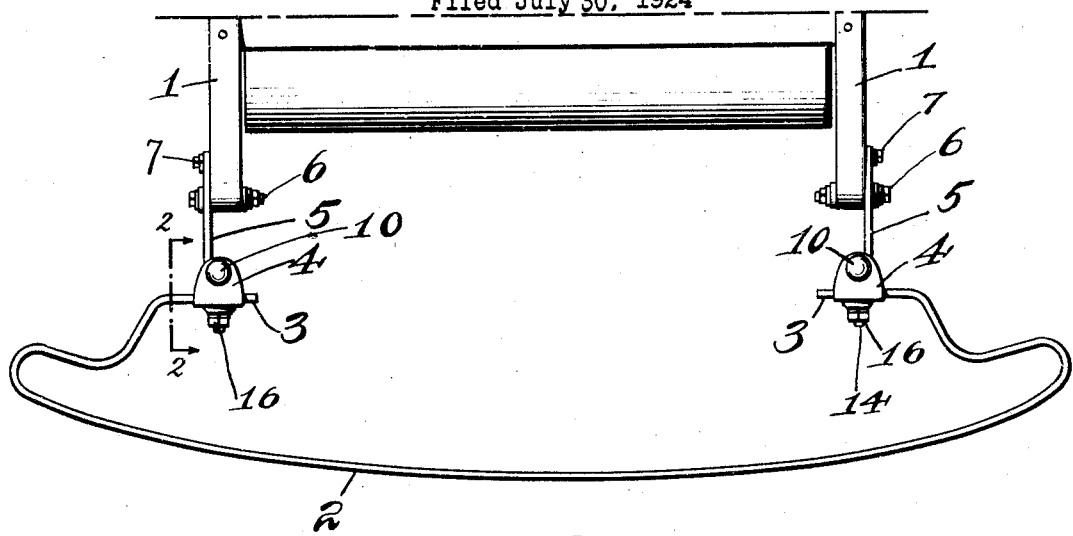
Figure 1 is a fragmentary top view of the front portion of an autombile, with a bumper connected thereto by brackets provided with pivot clamps embodying the invention.
Figure 2:
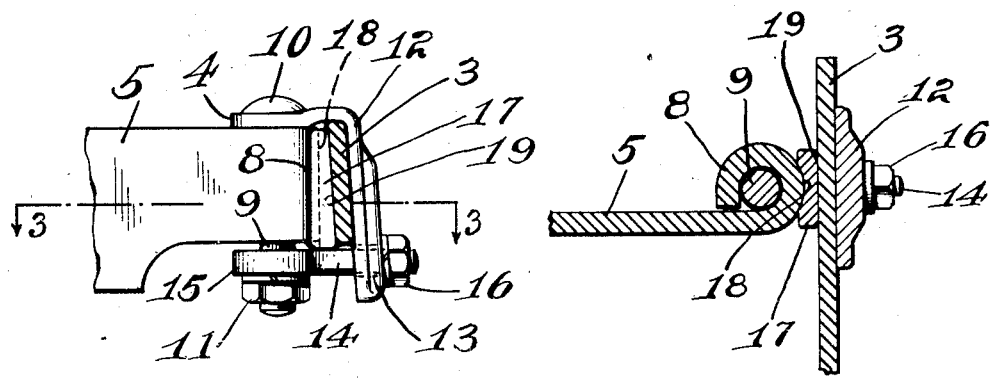
Figure 2 is a vertical section on the broken line 2—2 of Figure 1, on a larger scale.
Figure 3:
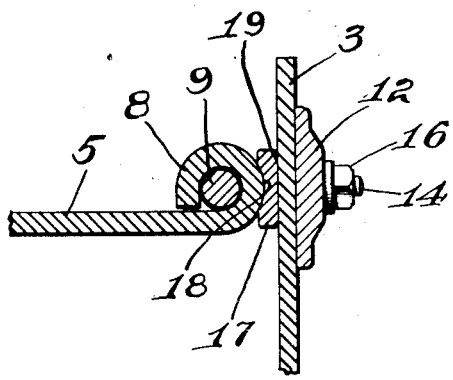
Figure 3 is a horizontal section on the broken line 3—3 of Figure 2.

In the illustrated embodiment, the reference character 1 designates the horns or front members of the frame of an automobile of conventional construction, and 2 designates a resilient strip bumper having its ends bent upon themselves to form return portions 3, which in accordance with the invention are supported in pivot clamps 4 of improved structure supported by brackets or arms 5 which are mounted upon the horns 1 by suitable means, being herein shown as transfixed by the conventional spring bolts 6 and as having anchor or stabilizer bolts 7, which limit the rotative adjustment of the arms 5 around the axis of the spring-bolts 6.

Each of the brackets 5 has at its forward end an eye 8 preferably having a rounded periphery and through which extends a pivot bolt having a shank 9, a head 10, and a nut 11.

This bolt serves as a pivot for the preferred form of clamping member 4, the latter comprising an attaching portion transfixed by the bolt 9, being held in place by the head 10 thereof, and from this attaching portion extends downwardly at 12 a clamping portion preferably inclined outwardly somewhat as indicated. This clamping portion has a hole at 13 to receive a clamping bolt 14 which is formed with an eye at 15 to fit upon the shank 9 of the pivot bolt, and has a nut 16 upon its threaded outer end, by tightening which the clamping portion 12 may be drawn inwardly toward the eye-bolt 8 and consequently toward the outer end of the bracket or supporting arm 5.

In accordance with the invention a wedge is provided at 17, preferably having a grooved rear surface 18 conforming in curvature and general contour with the upright forward surface of the bracket eye 8, and presenting forwardly a plane surface 19 to be engaged with the rear surface of the bumper bar portion 3, so that the latter will be supported at a slight angle to the vertical, as is desirable with resilient strip bumpers of this type.

Suitable clearance is provided between the above mentioned parts to permit adjustment of the wedge for the purpose of tightening the bumper within the clamp, and this actuation of the wedge is effected by tightening the nut 11 upon the pivot-bolt 10, which has the effect of forcing upward the eye 15 of the bolt 14, causing the shank of this eye-bolt to force upwardly the wedge 17, crowding it between the bumper part 3 and the eye-portion 8 of the bracket 5.

Without further description, it will be readily seen that the above structure affords an extremely powerful means for clamping a bumper in pivoted relation with the horn of an automobile frame, and that the improved pivot clamp has a universal character, capable of supporting bumpers of different makes and styles and applicable to a wide variety of automobiles.

The aforesaid arrangement of a wedge adjustably between the end of a supporting arm and a bumper bar confined within a clamp is essentially novel, and is so claimed broadly, whether the supporting arm constitutes an extension bracket mounted on a horn of the frame, as illustrated, which is the preferred arrangement, or whether the horn itself be utilized as the supporting arm, and the wedge arranged to operate directly between the curved end of the horn and a bumper bar confined by an appropriate form of the clamping member described, or whether some other suitable form of supporting arm and clamp be used in conjunction with the bumper bar, wedge and actuating devices.

Having described my invention, I claim:

1. An automobile bumper bracket comprising a supporting arm, having an eye, a clamping member connected with said arm by a pivot-bolt mounted in said eye, and serving therewith to embrace a bumper bar, a wedge member arranged to operate between said supporting arm and bumper bar, and means to actuate said wedge.

2. An automobile bumper bracket support comprising a supporting arm having an eye with a rounded exterior, a clamping member carried by said arm and serving therewith to embrace a bumper bar, a wedge member arranged to operate between said supporting arm and bumper bar, and means to actuate said wedge, said wedge member having a concave surface to be engaged with the rounded surface of said eye, and an inclined plane surface to be engaged with a co-operating plane surface of said bumper-bar.

3. A pivot-wedge-clamp for automobile bumper brackets comprising a clamping member having an attaching portion adapted to be transfixed by a pivot-bolt supported by a suitable part of the automobile frame, said clamping member having a clamping portion extended angularly from said attaching portion along the axis of said bolt and serving to embrace a bumper bar, a clamping bolt having an eye to be transfixed by said pivot-bolt and having a shank which passes through a hole in said clamping portion, a wedge confined within said clamping member between said clamping portion and the axis of said pivot-bolt, and a nut upon said eye-bolt to permit said clamping portion to be drawn with said bumper bar toward said pivot-bolt, said eye-bolt being adapted to be drawn toward the head of said pivot-bolt by the nut on said pivot-bolt, whereby the tightening of said pivot-bolt acts to force said wedge between said bumper bar and the part of said frame carrying said pivot-bolt.

4. An automobile bumper bracket comprising a supporting arm to be mounted on an automobile frame and having an eye, a pivot-bolt within said eye, a clamping member having an attaching portion transfixed by said pivot-bolt and having a bumper-clamping portion extended angularly from said attaching portion along said pivot-bolt, a clamping-bolt having an eye transfixed by said pivot-bolt, and having a shank which passes through a hole in said clamping portion, a wedge confined within said clamping member between said bumper and the eye of said supporting arm, adjacent to the shank of said eye-bolt, and nuts upon said eye-bolt and pivot-bolt respectively to permit said clamping portion and the bumper bar embraced thereby to be drawn toward said supporting arm, and to permit said eye-bolt to be drawn against said wedge, to force said wedge between, and into binding engagement with, said bumper and the end of said supporting arm.

5. In a device of the kind described, the combination, with a support having an eye, of a stirrup connected to said eye, a bumper bar arranged in said stirrup, and wedging means arranged within the stirrup and adapted to be brought into engagement with the bumper bar and eye.

In witness whereof, I have signed this specification.

OSCAR H. GOETZ.